United States Patent
Johnson et al.

(10) Patent No.: US 9,654,206 B1
(45) Date of Patent: May 16, 2017

(54) HUB ENABLED SINGLE HOP TRANSPORT FORWARD ACCESS

(71) Applicant: Lockheed Martin Corporation, Bethesda, MD (US)

(72) Inventors: Russell K. Johnson, Half Moon Bay, CA (US); James Alan Ivey, Palo Alto, CA (US); Aniruddha R. Karmarkar, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 216 days.

(21) Appl. No.: 14/244,829

(22) Filed: Apr. 3, 2014

Related U.S. Application Data

(60) Provisional application No. 61/808,613, filed on Apr. 4, 2013.

(51) Int. Cl.
| | | |
|---|---|---|
| *H04B 7/185* | (2006.01) | |
| *H04L 5/16* | (2006.01) | |
| *H04L 12/931* | (2013.01) | |
| *H04L 12/947* | (2013.01) | |

(52) U.S. Cl.
CPC ..... *H04B 7/18584* (2013.01); *H04B 7/18582* (2013.01); *H04L 5/16* (2013.01); *H04L 49/25* (2013.01)

(58) Field of Classification Search
CPC ............ H04B 7/18582; H04B 7/18584; H04L 49/25–49/258; H04L 49/3018; H04L 49/3027
See application file for complete search history.

(56) References Cited

U.S. PATENT DOCUMENTS

| | | | | |
|---|---|---|---|---|
| 5,485,464 A * | 1/1996 | Strodtbeck | ......... | H04B 7/18523 370/319 |
| 6,775,251 B1 * | 8/2004 | Wiedeman | ......... | H04B 7/18558 370/316 |
| 2002/0089943 A1 * | 7/2002 | Faineant | ............ | H04B 7/18582 370/319 |
| 2002/0131375 A1 * | 9/2002 | Vogel | ................. | H04B 7/18584 370/322 |
| 2003/0169731 A1 * | 9/2003 | Wickeraad | ............ | H04L 49/254 370/359 |
| 2011/0268158 A1 * | 11/2011 | Miller | ................... | H04B 7/2041 375/138 |
| 2012/0300697 A1 * | 11/2012 | Agarwal | ............ | H04B 7/18515 370/326 |
| 2012/0314577 A1 * | 12/2012 | Sun | ......................... | H04L 47/12 370/235 |
| 2015/0078250 A1 * | 3/2015 | Mineta | .................... | H04J 13/10 370/320 |

\* cited by examiner

*Primary Examiner* — Hoon J Chung
(74) *Attorney, Agent, or Firm* — McDermott Will & Emery LLP

(57) ABSTRACT

A satellite system is configured to receive and allow direct forwarding of traffic on a time slot by time slot basis without demodulation or decoding. The satellite system may be configured to receive waveforms and configured to separate a waveform of data from a waveform of control information. The satellite system may be configured to switch the waveform of data toward one or more terminals and configured to switch the waveform of control information toward a satellite control unit without demodulation or decoding of the waveforms. A method for satellite communication is also provided.

7 Claims, 11 Drawing Sheets

HUB ENABLED SINGLE HOP TRANSPORT FORWARD ACCESS

CROSS-REFERENCES TO RELATED APPLICATIONS

This application claims the benefit of priority from U.S. Provisional Patent Application Ser. No. 61/808,613, entitled, "HUB ENABLED JAMMER EXCISION," filed on Apr. 4, 2013, which is hereby incorporated by reference in its entirety for all purposes.

STATEMENT REGARDING FEDERALLY SPONSORED RESEARCH OR DEVELOPMENT

Not applicable.

FIELD

The disclosure relates in general to satellite communication, and more particularly to, for example, without limitation, a hub enabled single hop transport forward access (HFA) mode.

BACKGROUND

A satellite commination system may include an uplink(s) and a downlink(s). The uplink may be a portion of a communication link used for transmission of signals from a ground terminal to a satellite. The downlink may be a portion of a communication link used for transmission of signals from a satellite to a ground terminal Purely transponded satellite systems send all signals received on the uplink to a hub/gateway for processing and may require a multitude of hub/gateways, therefore greatly increasing overall system cost and vulnerability, and reducing system reliability and overall traffic capacity.

The description provided in the background section, including without limitation, any problems, features, solutions or information, should not be assumed to be prior art merely because it is mentioned in or associated with the background section. The background section may include information that describes one or more aspects of the subject technology.

SUMMARY

The description in this summary section may provide some illustrative examples of the disclosure. This section is not intended to be a broad overview or to identify essential elements of the disclosure.

In one or more implementations, a satellite system is configured to receive and allow direct forwarding of traffic on a time slot by time slot basis without demodulation or decoding. The satellite system may be configured to receive waveforms and configured to separate a waveform of data from a waveform of control information. The satellite system may be configured to switch the waveform of data toward one or more terminals and configured to switch the waveform of control information toward a satellite control unit without demodulation or decoding of the waveforms.

In one or more implementations, a method for satellite communication may include receiving waveforms associated with one or more uplinks between a satellite and at least one terminal and separating waveforms of data from waveforms of control information. The method may include forwarding the waveforms of data on a time slot by time slot basis for one or more downlinks between the satellite and one or more terminals and forwarding the waveforms of control information on a time slot by time slot basis to a satellite control unit. The method may include dynamically altering uplink signal robustness and rate based on uplink measurements provided by the satellite control unit, dynamically altering downlink signal robustness and rate based on downlink measurements provided by the satellite control unit, and dynamically varying a playback rate of the waveforms of data for downlink based on the downlink measurements.

DETAILED DESCRIPTION

Figure 1:
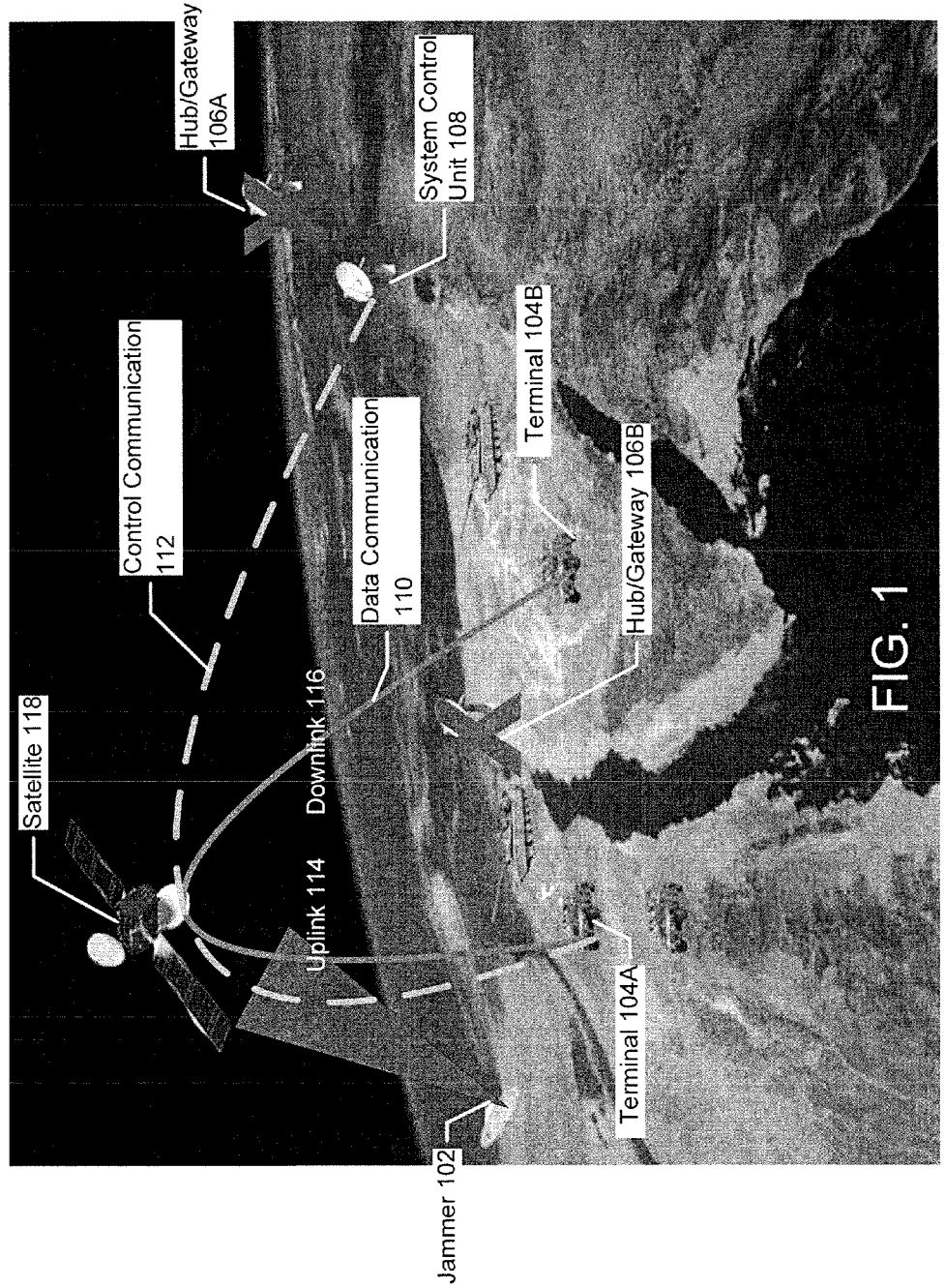
FIG. 1 depicts an example of a satellite servicing a large geographic area, where the satellite utilizes hub enabled single hop transport forward access (HFA).

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. Some of the words or phrases are expressed using one or more capital letters for convenience only and do not limit its meaning in any manner.

Hub Enabled Single Hop Transport Forward Access

In one or more implementations, a hub enabled single hop transport forward access (HFA) mode is a communication satellite operating mode motivated by the need for an affordable giga-bit-per-second (Gbps) class satellite that increases capacity and service flexibility, reduces latency, increases system security, reduces ground infrastructure and cost, simplifies control and planning, and increases robustness to electronic warfare (EW) threats such as jamming.

Purely transponded satellite systems send all signals received on the uplink to a hub/gateway for processing, including signals with both source and destination terminals in direct view of the satellite. The purely transponded satellite system may incur four major signal propagation delays: (1) terminal-to-satellite delay, (2) satellite-to-hub/gateway delay, (3) hub/gateway-to-satellite delay, and (4) satellite-to-destination terminal delay. For communication between terminals within view of the satellite, purely transponded systems may incur two unnecessary relay delays. The two unnecessary relay delays may include one unnecessary relay delay from the satellite to a hub/gateway over a feeder link for the uplink traffic (e.g., as discussed in (2) above) and an additional unnecessary relay delay from the hub/gateway to the satellite over the feeder link for the downlink traffic (e.g., as discussed in (3) above). Furthermore, purely transponded satellite systems may require far more complex and higher capacity feeder links to support the unnecessary relays to the gateway/hub than would be necessary if all communication between terminals within direct view of the satellite were direct (e.g., avoiding the hub/gateway relays). A purely transponded system may require a multitude of hub/gateways, therefore greatly increasing overall system cost and vulnerability, and reducing system reliability and overall traffic capacity. The hub/gateway feeder link may often become a major traffic bottleneck.

There may be several potential problems with direct routing of signals between terminals that lie within direct view of the satellite. First, uplink and downlink data rates, bandwidths, and time slots may often be incommensurate. For example, a 20-MHz uplink is not directly compatible with a 150-MHz downlink. Modulation and coding may not be directly compatible. For example, uplink Quadrature Phase-Shift Keying (QPSK) modulation with Low-Density Parity Check (LDPC) coding would not be compatible with downlink 8-PSK with turbo coding. Furthermore, downlinks may be often shared by all terminals (e.g., broadcast), whereas uplinks are Time Division Multiple Access (TDMA). In addition, direct relay of the uplink signal onto the downlink may involve complex demodulation and re-modulation of the signal on the satellite, which increases satellite complexity and cost. In addition, in one or more implementations, uplink signals must have a control component that must be routed to a satellite system controller (SSC) and not the destination terminal Thus, direct relay of the uplink signal to the destination terminal might not relay the terminal control signal to the SSC. There could be potential problems with uplink and downlink synchronization. A method to allow broadcast or multicast from the uplink to any or all of the downlink beams, as well as unicast of uplink signals to the downlink would also need to be provided.

In one or more implementations, the present disclosure addresses a method to allow direct relay (e.g., no gateway/hub relay) of signals that have both source and destination terminals within view of any of the beams of the satellite. The present disclosure offers, among others, significant latency reduction, Quality of Service (QoS) improvement, system cost and vulnerability advantages. A significant portion of the satellite traffic may be carried in this mode since satellite coverage areas are immense and it is most often the case that the source and destination terminal are in view of the satellite. In one or more aspects, the present disclosure allows unicast, multicast, or broadcast of downlink signals onto any or all downlink beams. In one or more aspects, the present disclosure allows for both time and carrier synchronization of the relayed signal by the destination receiver. In one or more aspects, the present disclosure reduces satellite cost and complexity by not requiring demodulation or decoding of the signal received by the satellite prior to relay.

FIG. 1 depicts an example of a satellite servicing a large geographic area, where the satellite utilizes hub enabled single hop transport forward access (HFA). Data communication 110 (e.g., in-theater traffic) may often constitute 90% or more of all user traffic in typical usage. HFA may allow a multitude of users to communicate with single hop (e.g., terminal 104A to satellite 118, and satellite 118 to terminal 104B), low latency, high quality service directly through the satellite to the destination terminal, completely bypassing any hub/gateway (e.g., hub/gateway 106A-106B). HFA may thereby limit the proliferation of hubs/gateways that would otherwise be required to support this capacity level. Minimizing hub/gateway infrastructure may be a key driver in reducing overall satellite system cost and vulnerability, improving Quality of Service (QoS), and increasing security. HFA may be fully compatible with "double hop" user-to-gateway traffic (e.g., control communication 112) for the small fraction of reach back traffic that may be required to be sent to a system control unit 108. System control unit 108 may include one or more hubs and/or gateways. Alternatively, or in addition, system control unit 108 may comprise or represent a satellite system controller (SSC). HFA mode can be integrated on a Dehop Rehop Transponded (DRT) payload supporting: wideband frequency hopping (e.g., multiple GHz) for EW protection, advanced adaptable multi-mode modulation and coding, and advanced spatial/temporal interference cancellation that reduces vulnerability to EW threats (e.g., from jammer 102). Uplink 114 includes one or more uplink signals from terminal 104A to satellite 118. Downlink 116 includes one or more downlink signals from satellite 118 to terminal 104B. As noted above, uplink and downlink data rates, bandwidths, and time slots may often be incommensurate. In one or more implementations, uplink 114, downlink 116 and control communication 112 involve wireless communications, and each of satellite 118, terminals 104A and 104B, and system control unit 108 are remote from each other.

HFA Data Path

Figure 2:
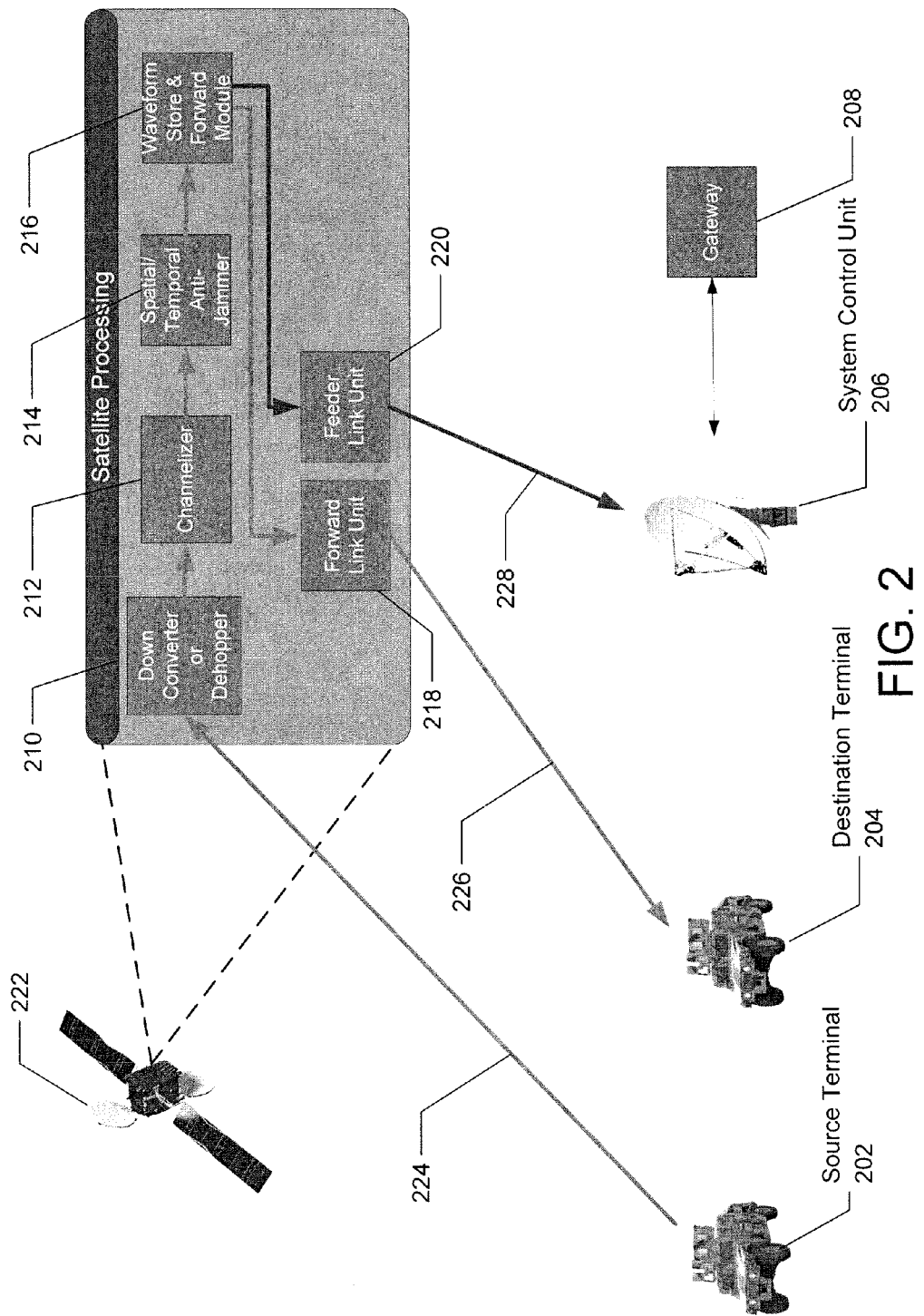
FIG. 2 illustrates an example of a single HFA low latency single hop in-theater data path.

FIG. 2 illustrates an example of a single HFA low latency single hop in-theater data path. Source terminal 202 may transmit one or more signals including, for example, data and control information. The data may be destined for a destination terminal 204 (e.g., another in-coverage-area terminal). The control information may be sent to system control unit 206. The transmitted one or more signals may be frequency hopped. The transmitted one or more signals may propagate up to a satellite 222, for example, as one or more uplink signals via an uplink 224. Satellite 222 may receive the transmitted one or more signals, down convert or dehop them using a down converter or dehopper 210, thereby eliminating most of the EW jammer energy. Satellite 222 may digitize, extract and separate all uplink signals at a channelizer 212 (e.g., digital channelizer). An advanced spatial/temporal interference cancellation may further mitigate jammer energy via a spatial temporal anti jammer 214.

Uplink signals including, for example, uplink beams, channels, and time slots designated for an HFA mode may be waveform stored and forwarded to the appropriate downlink beam by Waveform Store and Forward (WSAF) module 216. WSAF module 216 may separate data from control information, switch data to forward link unit 218, and switch control information to feeder link unit 220. In one or more implementations, forward link unit 218 may include one or more digital-to-analog converters, one or more upconverters and one or more high power amplifiers. In one or more implementations, feeder link unit 220 may include one or more digital-to-analog converters, one or more upconverters and one or more high power amplifiers.

Data may be replayed at the appropriate time and bandwidth (e.g., via playback rate adjustment) on a downlink beam via forward link unit 218, while control information may be separately routed via feeder link unit 220. The replayed data (e.g., in-theater user data) may be transmitted on downlink 226 directly to destination terminal 204. Control information may be sent to system control unit 206 via feeder link 228. System control unit 206 may be in communication with gateway 208 and/or include one or more gateways. Further, system control unit 206 may represent one or more hubs and/or include or represent satellite system controller (SSC). Control information may be processed at system control unit 206 or at a space vehicle in some configurations. Alternatively or in addition, processing of the control information may be optimally split between a satellite and a system control unit.

Figure 3A:
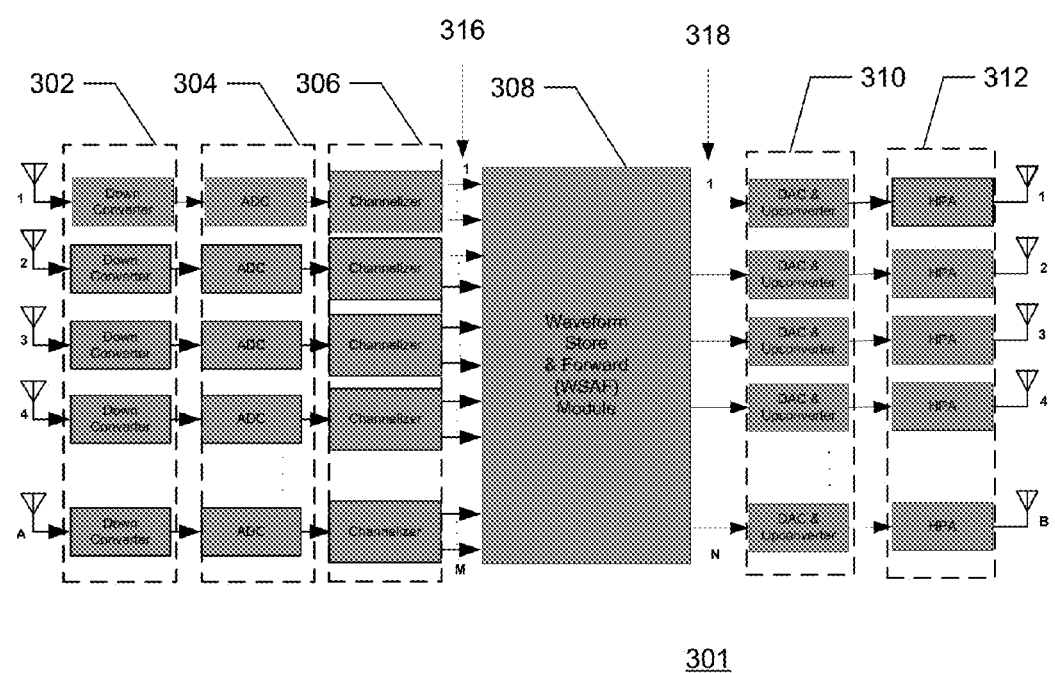
FIG. 3A depicts an example of an HFA-enabled satellite system.

FIG. 3A depicts an example of an HFA-enabled satellite system. It illustrates an example of a detailed view of the full multi-beam/multi-channel signal processing associated with an HFA mode. A satellite system 301 may include down converters 302, analog-to-digital converters (ADCs) 304, channelizers 306, Waveform Store and Forward (WSAF) module 308, digital-to-analog converters (DACs) and upconverters 310, and high power amplifiers (HPA) 312. Down converters 302 may be in communication with antennas. HPA 312 may be in communication with antennas.

In one or more aspects, down converters 302 may correspond to down converter or dehopper 210 of FIG. 2. In one or more aspects, channelizers 306 may correspond to channelizer 212 of FIG. 2. In one or more aspects, Waveform Store and Forward (WSAF) module 308 may correspond to Waveform Store and Forward (WSAF) module 216 of FIG. 2. DACs and upconverters 310 and HPA 312 may correspond to forward link unit 218 of FIG. 2. While ADCs are not shown in FIG. 2, in one or more implementations, the system of FIG. 2 includes ADCs (e.g., ADCs 304) between down converter or dehopper 210 and channelizer 212.

Multiple beams may be received by down converters 302 via antennas from one or more source terminals. While FIG. 3A shows uplink beam 1 through uplink beam A, the subject technology is not limited thereto. A portion of the spectrum in each beam may be down converted to a low intermediate frequency (IF) by the respective one of down converters 302 and sampled by the respective one of ADCs 304. Each digital IF signal from each beam may contain one or more Time Division Multiple Access (TDMA) channels that are active within each beam.

A total of M uplink channels and A uplink beams are depicted in FIG. 3A; however, the subject technology is not limited thereto, and can apply to other multiples of uplink channels and beams, as well as to groupings of different uplink channels and beams. Each channel associated with its respective beam is digitally isolated and converted to digital baseband in channelizers 306 (e.g., uplink channelizers). Each channelized baseband signal may be passed to Waveform Store and Forward (WSAF) module 308. Waveform Store and Forward (WSAF) module 308 may include uplink interface 316 and downlink interface 318. Each downlink signal from the downlink interface 318 may be converted to analog form via the DACs and upconverters 310 (e.g., upconverted in frequency to RF), and amplified by HPA 312.

Figure 3B:
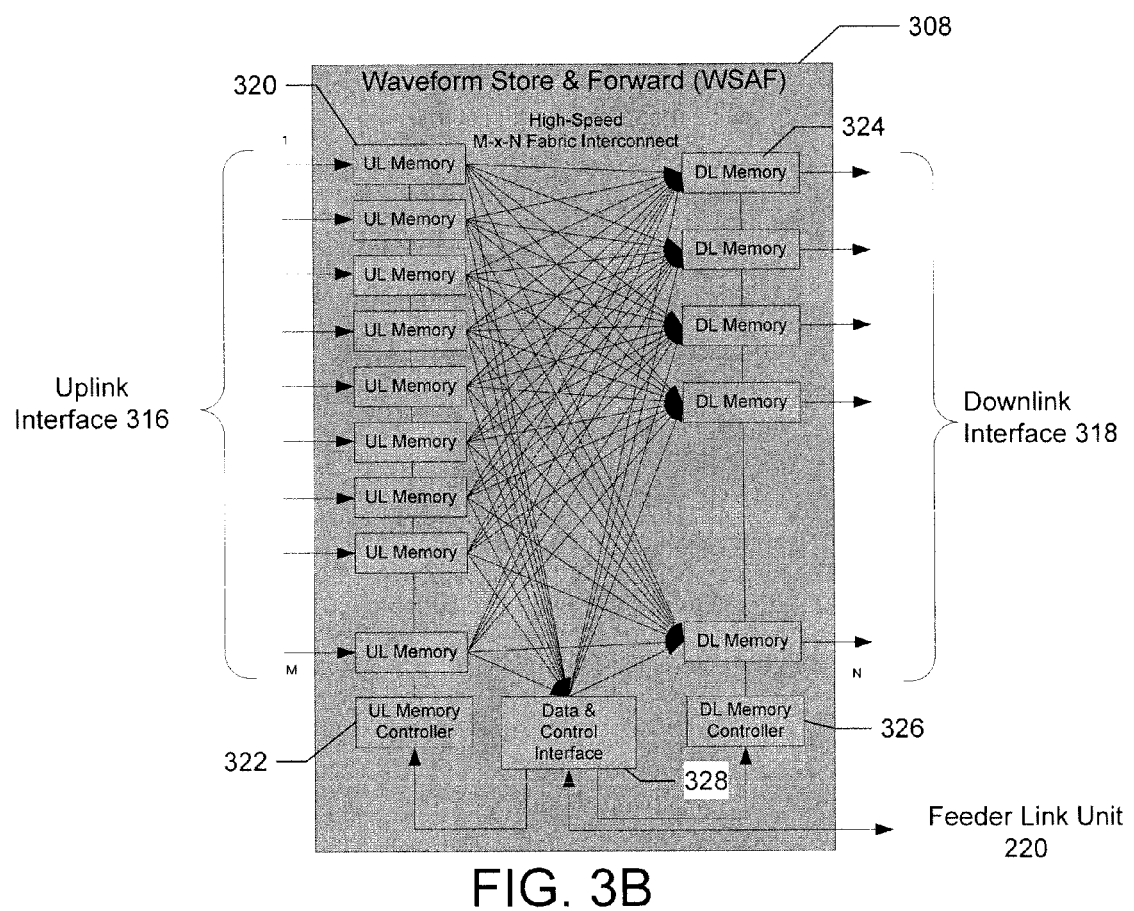
FIG. 3B depicts an example of a Waveform Store and Forward (WSAF) module and an example of its operation.

FIG. 3B depicts an example of a Waveform Store and Forward (WSAF) module and an example of its operation. As noted above, Waveform Store and Forward (WSAF) module 308 may include uplink interface 316 and downlink interface 318. A WSAF uplink (UL) memory controller 322 may cause the uplink waveform associated with each TDMA slot operating in HFA mode to be stored in the appropriate one of the uplink memories (e.g., UL memory 320). Downlink (DL) memory controller 326 may forward the captured waveform to the appropriate downlink (DL) memory (e.g., DL memory 324) associated with the assigned destination beam(s) and channel via a high-speed interconnect fabric. The high-speed interconnect fabric allows signal forwarding from M uplink channels/beams, to any of N downlink channels/beams as illustrated in FIG. 3B. A total of M uplink channels/beams and N downlink channels/beams are depicted in FIG. 3B; however, the subject technology is not limited thereto, and can apply to other multiples of uplink and downlink channels/beams, as well as to groupings of different uplink and downlink channels/beams.

The WSAF module 308 may extract waveform(s) from downlink memories (e.g., DL memory 324) and replay them on the appropriate downlink beam and channel in the time slot assigned by the satellite system controller (SSC), and at a rate commensurate with the downlink bandwidth (BW) (e.g., maximum downlink BW, or less, as commanded by SSC). Control signals associated with HFA transmissions may be separated by WSAF module 308 and sent over via data and control interface 328 to the SSC. The SSC may load the forwarding tables (e.g., a switching look-up table) from the ground via the feeder link (e.g., feeder link 228 of FIG. 2) and feeder link unit (e.g., feeder link unit 220). Using the forwarding tables, WSAF 308 may control forwarding of the signal associated with uplink beam, channel, and time slots to downlink beams, channels, time slots. Alternatively, or in addition, using the forwarding tables, WSAF module 308 may control extraction of control signals and their forwarding to the SSC.

One or More Aspects of Features

Single Hop Transport

For many communication satellites, the majority of user data traffic is between terminals within view of the satellite. This traffic can theoretically be relayed from one or more source terminals to one or more destination terminals directly through a single satellite, either as inter-beam traffic or intra-beam traffic, without the need for an intermediary hop over a feeder link to a ground-based hub/gateway for processing. In such systems, single hop user data traffic may be transmitted from the source terminal via the uplink to a satellite, which is sometimes referred to as a space vehicle (SV). The SV may receive and process the uplink signal, switch and transmit the signal directly on the appropriate downlink beam and channel to the one or more destination terminals. Single hop transfer may reduce overall data traffic latency since no intermediary transmission to and from a hub/gateway via a feeder link is required. Single hop user data transfer may also increase the Quality of Service (QoS) since overall terminal-to-terminal signal latency is reduced vis-à-vis a hub-based satellite relay system. In one or more implementations, HFA can provide single hop transfer of data.

Reduced Hubs/Gateways

In purely transponded satellite systems, a hub/gateway is a ground based processing center. All uplink user traffic received by a satellite may be relayed via a feeder link to the hub/gateway for processing and switching. In-theater traffic may be then relayed back up the feeder link for subsequent transmission on the appropriate satellite downlink (DL) beam and channel to the ultimate destination terminal. A typical hub/gateway based satellite system may require a multitude of hubs/gateways. Low cost satellite systems may seek to reduce or altogether eliminate the number of hubs and gateways to reduce overall system cost, reduce user data signal delay, improve Quality of Service (QoS), and reduce security and vulnerability concerns associated with hubs and gateways.

One or More Aspects of Details of HFA

Uplink Format

Figure 4:
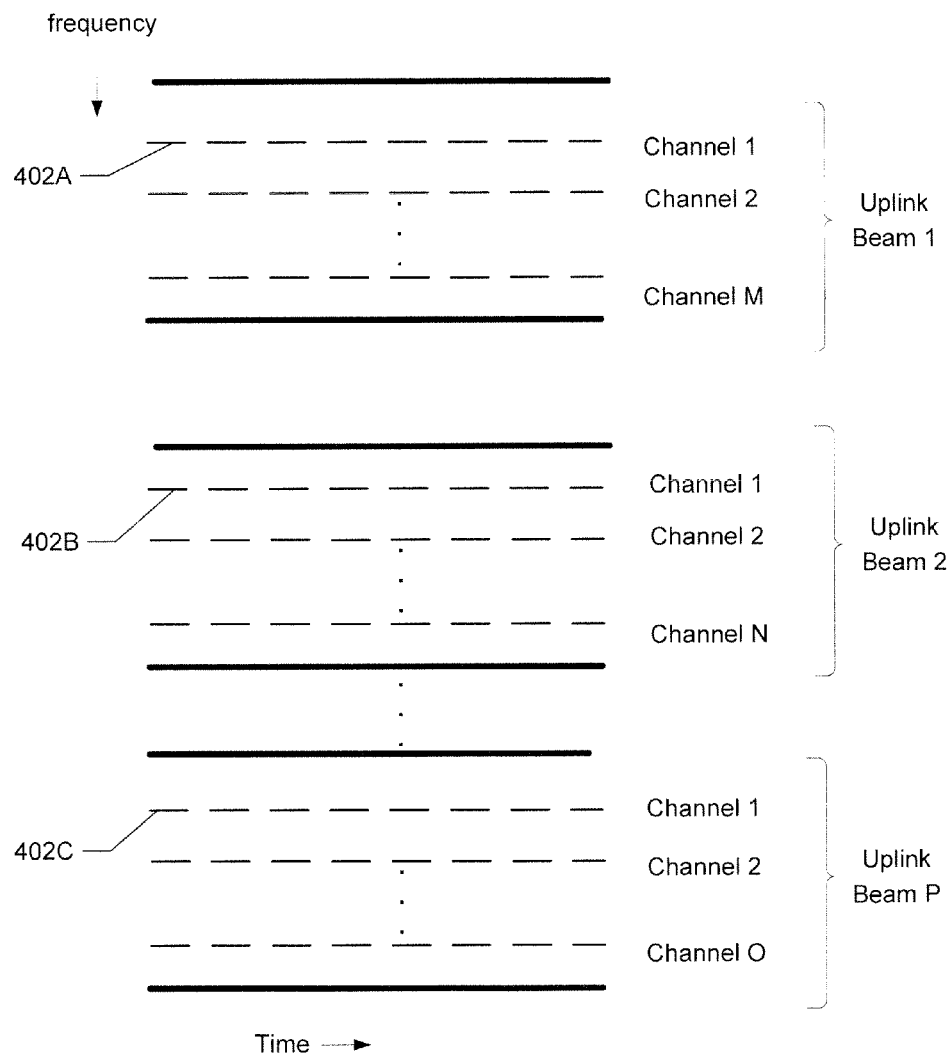
FIG. 4 depicts an example of an uplink signal format.

FIG. 4 depicts an example of an uplink frame format. HFA allows each satellite to support multiple uplink beams (e.g., uplink beams 1 through P), with each satellite beam including one or many channels (e.g., channels 1 through M, channels 1 through N, and channels 1 through O) as depicted in FIG. 4. HFA allows a multitude of bandwidths to be supported by each channel (e.g., uplink channel). Each channel may have a Time Division Multiple Access (TDMA) format. Specific users may be assigned specific beams, channels, and time slots (e.g., 402A-402C) by the satellite system controller (SSC). The channels may or may not be frequency hopped (e.g., shown as not hopping in FIG. 4). There may be no restriction on the modulation used by the uplink. The satellite may provide some (e.g., unspecified) method to keep terminals aligned in their TDMA slots (e.g., usually implemented by a method of ranging signal). The uplink signal may support carrier synchronization in the form of embedded phase reference symbols in each TDMA burst.

Downlink Format

Figure 5:
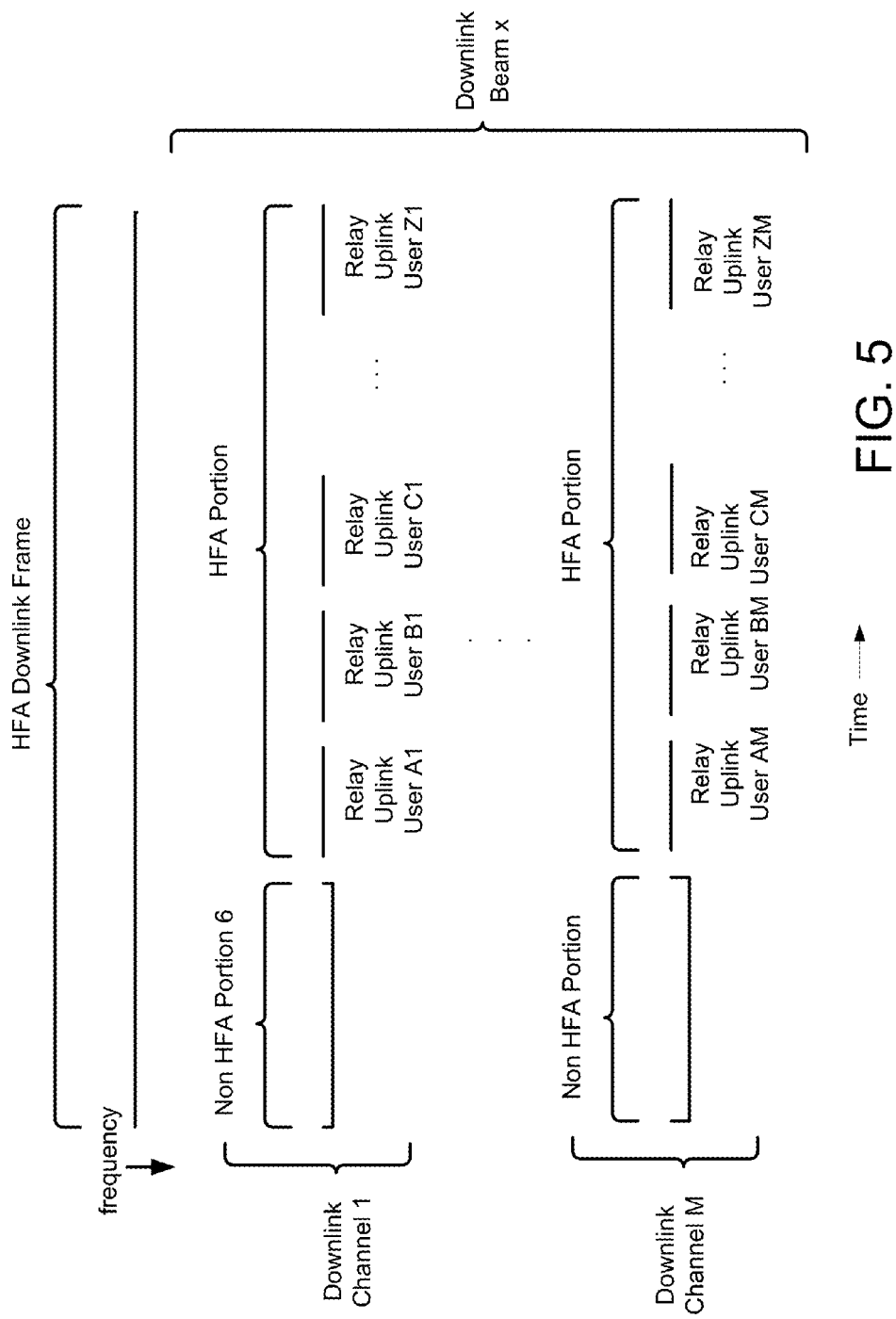
FIG. 5 depicts an example of a downlink signal format.

FIG. 5 depicts an example of a downlink frame format. HFA may utilize one or more downlink channels as depicted in FIG. 5. HFA may allow a multitude of downlink bandwidths. In one or more implementations, HFA may not use a TDMA format over the full downlink frame; however, in one or more implementations, the HFA mode does require that a portion of the downlink time is dedicated to HFA signals, and during the time allocated to downlink HFA mode a TDMA format is used. The bandwidth utilized by HFA downlink may be equal to or less than the maximum downlink bandwidth assigned to the channel. In one or more implementations, the modulation and coding used on the HFA downlink time slot conforms to the modulation and coding used by the uplink signal mapped to each downlink time slot.

Mapping between Uplink and Downlink

Figure 6:
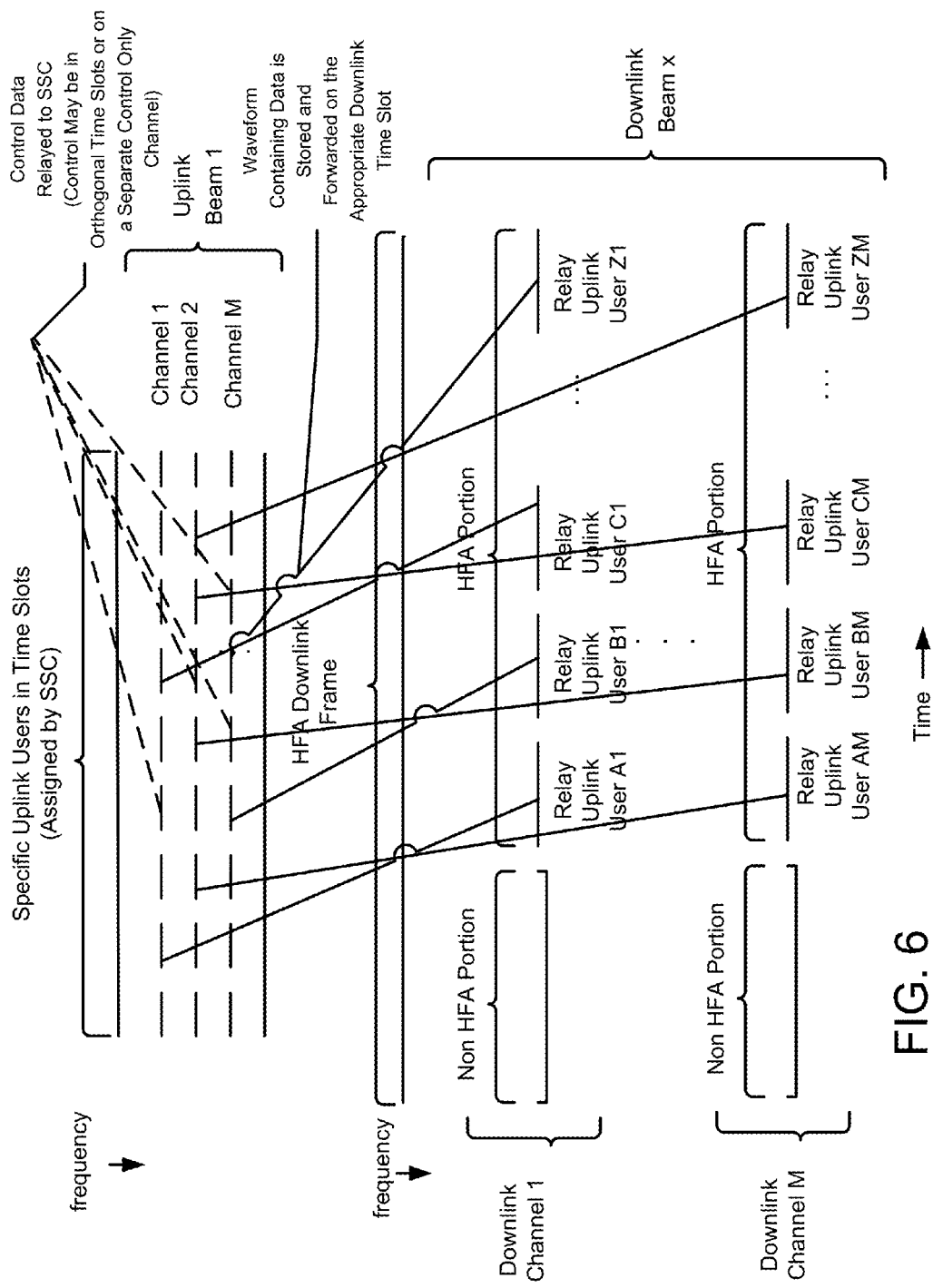
FIG. 6 depicts an example of mapping of HFA uplink frames to downlink frames.

FIG. 6 depicts an example of mapping of HFA uplink frames to the downlink frames. Time slots designed for transport in HFA mode may be digitally sampled by the satellite, stored, and the stored signal may be replayed (e.g., forwarded) at the appropriate time and rate (e.g., to match the desired downlink bandwidth) on the designated downlink HFA time slot as discussed in details with reference to FIG. 3B. In one or more implementations, no demodulation or decoding of the uplink signal is made at the satellite (e.g., by a Waveform Store and Forward (WSAF) module or other components of the satellite) prior to forwarding the signal onto the downlink; only the uplink waveform is forwarded verbatim on the downlink. In one or more implementations, control time slots are separately sampled, utilizing a WSAF module, but are not sent to the destination terminal; instead, control time slots are forwarded, utilizing a WSAF module, to the satellite system controller (SSC) for demodulation, decoding, and processing.

Waveform Store and Forward (WSAF)

According to one or more implementations, exemplary operations of a Waveform Store and Forward (WSAF) module is illustrated. A WSAF module may be sometimes referred to as WSAF circuits. A WSAF module allows the waveform associated with each uplink TDMA time slot in each channel operated in HFA mode to be digitally sampled and briefly stored on one or more memories of the satellite. In one or more implementations, no demodulation or decoding is performed on the waveform by the WSAF module or any other components of the satellite. The WSAF module causes the waveform itself (e.g., without demodulation) to be briefly stored at the satellite for replay. In one or more implementations, the WSAF module can replay the appropriate uplink waveform (or uplink signal) on the downlink channel and time slot associated with the destination terminal in HFA mode, or terminals (e.g., the channels and time slots for HFA mode that are previously assigned by the satellite system controller (SSC)). The WSAF module can cause the stored uplink waveform to be replayed on the appropriated forward link (downlink) beam, channel, and time slot at a rate associated with the maximum bandwidth of the downlink channel; or, if necessary, at a lower rate necessary to allow link closure and communication, taking into account the downlink channel conditions. The downlink channel conditions may include noise, jamming, mobility, receiver antenna obstructions, destination terminal size (e.g., large, medium, or small). Lowering the playback rate of the stored waveform on the downlink may increase the Energy per Bit to noise density ratio (Eb/No) received by the destination terminal (e.g., at the cost of lower throughput rate) and therefore may increase link robustness. This method of varying the playback rate of the waveform to match downlink channel conditions (e.g., weather, jamming, antenna obstructions, terminal size) and maximum downlink bandwidth may effectively decouple the uplink signal robustness from the downlink signal robustness. This may allow the SSC to dynamically and independently adjust the uplink (e.g., coding, modulation, and/or bandwidth) and downlink bandwidth to meet the conditions of each link (e.g., weather, jamming, noise, terminal size) independently.

Control Channel (e.g., Terminal to SSC, Uplink)

In HFA mode, separate uplink time slots (e.g., time orthogonal) or channels (e.g., frequency orthogonal) for terminal to satellite system controller (SSC) communications may be assigned (e.g., a control channel). Control time slots and/or a separate control channel may be assigned to each uplink terminal operating in HFA mode by the SSC. The time slots or frequency used by the control channel may be orthogonal to the HFA data. In one or more implementations, a WSAF module can cause uplink control signals to be sampled and separately forwarded to satellite system controller (SSC) for processing and not forwarded to the destination terminal at all. Having separate uplink control and data time slots may increase system robustness and security since the data and control planes have been separated. Separation of data and control plane may allow satellite to centrally control connectivity among a group of user terminals. This may allow satellite user terminals to have their own secure virtual private network over an HFA enabled satellite. This may simplify the satellite design since only control channels need to be demodulated by the satellite system controller (SSC). In one or more implementations, a WSAF module causes system control messages to be separated and forwarded to the SSC and not the destination terminal; this is because all control for HFA mode is commanded by the SSC, so all control messages from terminals are forwarded by the WSAF module to the SSC.

Control Channel (e.g., SSC to Terminal, Downlink)

In one or more implementations, the control channel from the SSC to the terminal is unspecified in the present disclosure, but a control path exists on the non-HFA portion of the downlink between the SSC and each terminal.

HFA Features

Elimination of Gateways via HFA

In one or more implementations, HFA eliminates nearly all ground hubs and gateways and their associated complexity, delay, and security vulnerability. In one or more implementations of HFA, a WSAF module causes the waveforms of all inter-theater uplink signals to be briefly stored and then directly forwarded on the appropriate downlink beams, channels, and time slots, thus reducing or altogether eliminating hub/gateway traffic. In one or more implementations, only traffic specifically destined for a gateway needs to be relayed through the hub to a gateway (e.g., reach back traffic).

Modulation Independence

In one or more implementations, HFA is compatible with any or all types of modulation that is transmitted during an uplink channel time slot. In one or more implementations, HFA simply samples the uplink waveform, briefly stores it, and forwards it on the appropriate downlink beam, channel, and time slot, utilizing a WSAF module. In one or more implementations, an HFA-enabled satellite does not demodulate the waveform; so no specific baud, phase nor frequency synchronizers, demodulators nor remodulators, hard nor soft decision slicers, or pulse shaping filters are required by the HFA-enabled satellite. Further an HFA-enabled satellite can operate with any modulation. This allows the terminals to largely implement modifications to the burst size, modulation, and coding independent of the satellite so far as the basic terminal-to-satellite uplink TDMA and satellite-to-terminal downlink characteristics are maintained; thus future-proofing the original satellite investment.

Uplink Per Time Slot Circuit Switch (PTSCS)

In one or more implementations, HFA receives uplink signals on time slot boundaries (e.g., for each uplink beam and channel), waveform stores, and forwards (WSAF) on the appropriate downlink beam, channel, and time slot. The process of sampling and storing the waveform for each uplink time slot, and forwarding the waveform on the appropriate downlink beam, channel, and time slot may be a form of circuit switching (e.g., Per Time Slot Circuit Switching, PTSCS). This process may be performed by the Waveform Store and Forward (WSAF) module. The space vehicle (SV) may maintain a switching look-up table that maps uplink beam, channel time, and time slots to forward link beam, channel, and time slots. The switching table can be updated in real-time to dynamically alter the terminal-to-terminal connectivity. The WSAF module may utilize the switching look-up table in connection with storing and forwarding the waveform.

Uplink Per Uplink Time Slot Circuit Multi-Cast (PTSMC)

In one or more implementations, after receiving uplink signals each time slot (e.g., for each uplink channel and uplink beam), Waveform Store and Forward (WSAF) can also forward the stored waveform on multiple downlink beams simultaneously, effectively creating multi-cast or broadcast messages (e.g., Per Time Slot Multi-Cast, PTSMC). The space vehicle (SV) may maintain a switching look-up table that maps uplink beams, channels and time slots to multiple downlink beams and time slots to enable multi-cast and broadcast services. The WSAF module may utilize the switching look-up table in connection with storing and forwarding the waveform.

Independent Downlink and Uplink Modes

In one or more implementations, an HFA-enabled satellite (via e.g., a WSAF module) allows the satellite system controller (SSC) to select the downlink bandwidth for each downlink beam and channel independently of the uplink modulation or coding. This allows the SSC to efficiently respond to the downlink channel conditions. The downlink channel conditions may include jamming, noise, weather, user antenna blockage, terminal size (e.g., large, medium, or small) independently of the uplink modulation and coding. In one or more implementations, this is extremely important since many downlink and uplink link budget elements are independent (e.g., weather, jamming, noise, terminal size), so the SSC may need to be able to independently set the robustness level of the downlink. Lowering the downlink bandwidth by reducing the waveform playback rate may increase the downlink robustness to, for example, weather, jamming, terminal size, but lower the throughput rate. In one or more implementations, SSC may provide the control information (e.g., channel conditions and switching look-up tables) to a satellite via a feeder link unit to be used by a Waveform Store and Forward (WSAF) module. The feeder link unit may include one or more channels, downconvertors, upconvertors, ADCs and/or DACs. In one or more implementations, the feeder link unit includes one or more down converters and ADCs for the control information transmitted by SSC to the satellite. The feeder link may use a different frequency band than the uplink and/or downlink. Alternatively or in addition, uplink and downlink may use the same or different frequency band.

Control and Data Channel Separation

In one or more implementations, an HFA-enabled satellite (via e.g., a WSAF module) uses separate uplink time slots and/or a separate pure control channel for data and control for each channel and each uplink beam. For each uplink beam and channel a control circuit may be set up using uplink time slots and/or a separate pure control channel selected by the SSC. This separation of data and control via uplink channel time slots allows the satellite (e.g., a WSAF module) to extract control information at the payload and process it independently of the data plane signals that are forwarded onto the downlink.

Figure 7:
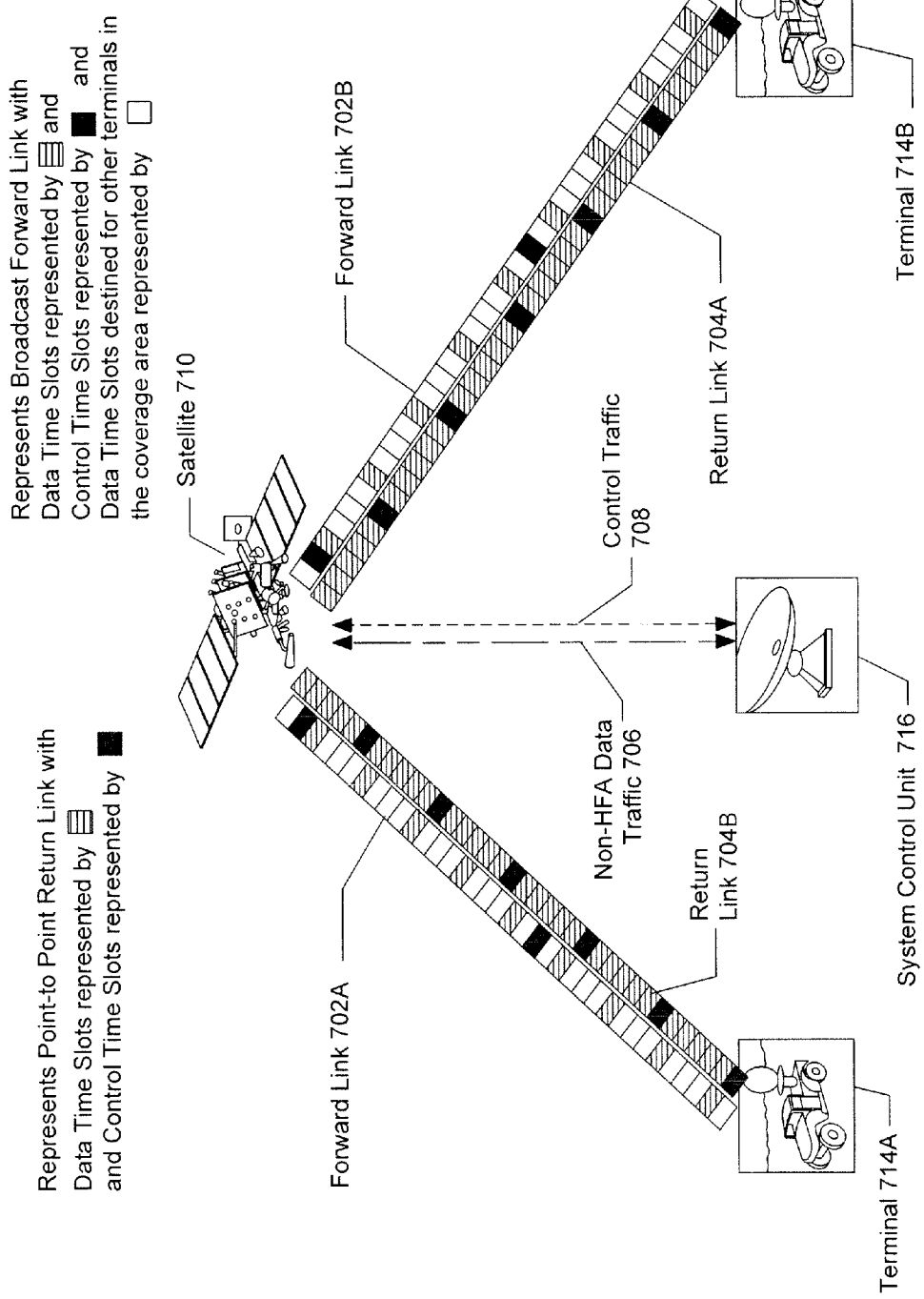
FIG. 7 illustrates an example of separation of control and data traffic when an HFA mode is supported for direct connection between two or more terminals.

FIG. 7 illustrates an example of separation of control and data traffic when an HFA mode is supported for direct connection between two or more terminals. Return link 704A/704B may be a point-to-point link between satellite 710 and terminal 714A/714B, respectively. Forward link 702A/702B may be broadcast links to some or all terminals with a coverage area. The aggregated traffic between satellite 710 and system control unit 716 may be carried over a wideband link with a different channelization and structure. Non-HFA data traffic 706 may include data traffic destined to one or more hubs/gateways. Control traffic 708 may be destined to system control unit 716 (e.g., SSC). Point-to-point return link (e.g., return link 704A or 704B) may include data time slots (e.g., represented by crosshatch in FIG. 7) and control time slots (e.g., represented by solid black in FIG. 7). Broadcast forward link (e.g., 702A or 702B) may include data time slots for terminal 714A or 714B (e.g., represented by crosshatch in FIG. 7), control time slots (e.g., represented by solid black in FIG. 7), and data time slots destined to other terminals in the coverage area (e.g., different from terminal 714A or 714B), which are, for example, represented by solid white in FIG. 7.

Forwarding Table

A mission management (MM) function can set up terminal-to-terminal(s) HFA paths a priori through mission planning. This may simplify terminal setup but is not as dynamic for user IP networks. Terminal-to-terminal(s) paths may also be setup dynamically on demand. Terminal Connectivity Groups within a satellite network can support path setup mechanisms typically supported by layer 2/3 overlay networks. This adds terminal complexity but provides dynamic setup based on terminal demand. Multiple options and multiple techniques are possible, including but not limited to the following: (1) Resource Reservation Protocol (RSVP)-like path setup, (2) Session Initiation Protocol (SIP) signaling for voice calls, and (3) Generic Routing Encapsulation (GRE) tunnel setup. Mixed Mode could also be supported. For example, one Connectivity Group can be planned through mission management while another is setup dynamically.

Terminal Logon

When a terminal logs on to a satellite system controller, it registers with the satellite system controller by providing a list of user addresses (e.g., MAC addresses or VLAN tags or IP address prefixes) reachable on its user interface (protocol dependent, e.g., SIP). The terminal decides what information about its networks should be exposed to the satellite network. The satellite network similarly does not expose any information about its internal network to the terminal user. It is completely opaque to the user networks. The terminal builds its applicable reachability tables independently as an overlay over the satellite network. The terminal only has an understanding about its Connectivity Group(s) and any required information. The satellite network does not know and does not need to know anything about the user network topology.

Forwarding Table Construction and Forwarding

In one or more implementations, a satellite system controller builds connectivity HFA forwarding tables among all logged-in users within each connectivity group based upon information and labels provided by each terminal during system login, and login standardized protocols (e.g., SIP, RSVP, GRE, etc.). The connectivity forwarding tables link the appropriate HFA uplink beam, channel, and time slot(s) to downlink beam(s), channel(s), and time slot(s) by setting up a cross-connect. Relevant forwarding table information is transmitted to each terminal in each connectivity group via the downlink non-HFA mode control communication. This login process allows each terminal to know HFA downlink and uplink time slots used for each of its connectivity groups.

Within a connectivity group many terminal connection types shown in Table 1 but not limited to the list provided in the table can be supported. Table 1, thus, provides some examples, but the subject technology is not limited to these examples.

TABLE 1

Connection Types

| Connection Type | Description |
|---|---|
| Point-to-Point Half Duplex (or Simplex) | A one-way connection between two terminals where one terminal is in transmit mode and the second terminal is in receive only mode. On the satellite the transmitting terminal return link beam(s), channel(s), time slot(s) are mapped to receiving terminal beam(s), channel(s), time slot(s). |
| Point-to-Point Full Duplex | A two-way connection between two terminals where 1) Terminal 1 transmits data to Terminal 2, and receives data from Terminal 2, and 2) Terminal 2 transmits data to Terminal 1, and receives data from Terminal 1. On the satellite the transmitting terminal return link beam(s), channel(s), time slot(s) are mapped to receiving terminal beam(s), channel(s), time slot(s). The connection between the two terminals can be symmetric (e.g., same data rate supported in both directions) or asymmetric (e.g., different data rates are supported in each direction). |
| Many Receivers One Transmitter Half Duplex Time Shared Transmit Connection | A one-way connection from a transmitting terminal is time shared by two or more terminals. Each connection is a half-duplex one-way connection between the transmitting and receiving terminal and is independent of connections to other receiving terminals in the time-shared terminal group because the connection is orthogonal in time to other receiving terminals in the time-shared terminal group. In a time-shared system only one connection is active at an instance of time between the transmitter and one of the receiving terminals of the time-shared group. As an example, Terminal 1 transmits to Terminal 2 during allocated time T2 for reception on Terminal 2 and transmits to Terminal 3 during allocated time T3 for reception on Terminal 3. The receiving terminals may be located in different antennas/beams and different channels. The mapping defined on the satellite ensures data destined for two terminals (e.g., return link beam(s), channel(s) and time slot(s)) are appropriately mapped on forward link destined for terminal 1 and terminal 2 beam(s), channel(S) and time slot(s) respectively. |
| Many Transmitters One Receiver Half Duplex Time Shared Receive Connection | This connection is exactly opposite setup to Half Duplex Time Shared Transmit Connection. A one-way time shared connection from many transmitting terminals to single receive terminal is set up. Each connection is a half-duplex one-way connection between transmitting terminal and the receiving terminal and is independent of connections to other transmitting terminals in the time-shared terminal group because the connection is orthogonal in time to other transmitting terminals in the time-shared terminal group. In a time-shared system only one connection is active at an instance of time between the receiver and one of the transmitting terminals of the time-shared group. As an example, Terminal 1 receives transmitted data from Terminal 2 during allocated time T2 and Terminal 1 receives transmitted data from Terminal 3 during allocated time T3. The transmitting terminals may be located in different antennas/beams and different channels. The mapping defined on the satellite ensures data destined from two terminals T2 and T3 (e.g., return link beam(s), channel(s) and time slot(s)) are appropriately mapped on forward link destined for Terminal 1 beam(s), channel(s) and time slot(s). |

TABLE 1-continued

Connection Types

| Connection Type | Description |
|---|---|
| Broadcast Connection | Data is broadcast by a terminal to one or more terminals over their respective forward links. Terminal 1 transmits on allocated beam(s), Channel(s), and Time slot(s) to Terminals 2 through N. Terminals 2 through N receive on their allocated beam(s), Channel(s), and Time slot(s). Satellite maps the return link data from transmitting terminal and makes copies for receiving terminals. The receiving terminals may be located in different antennas/beams and different channels. |

Figure 8:
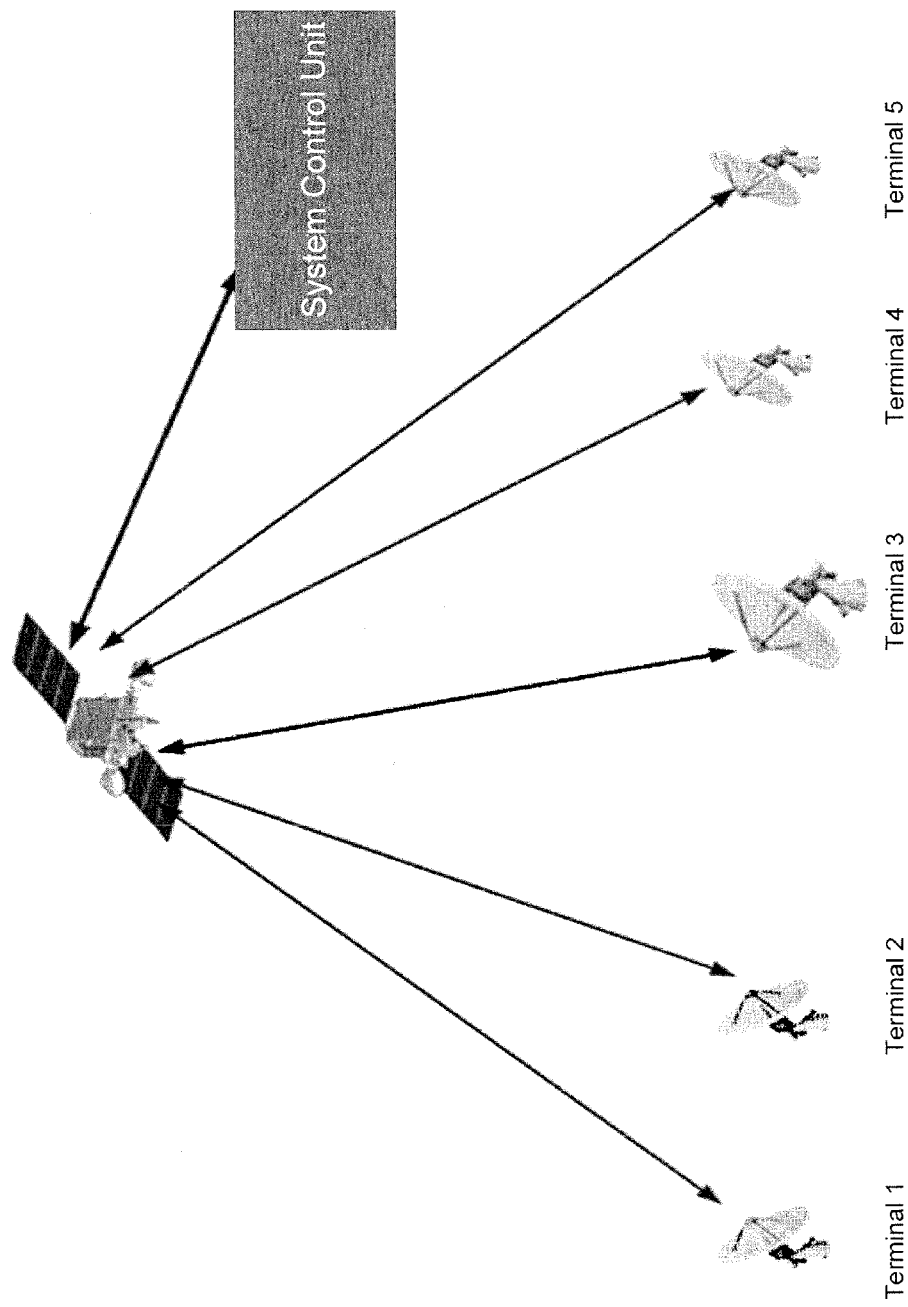
FIG. 8 illustrates an exemplary configuration for cross-connection and resource allocation using HFA.

FIG. 8 illustrates an exemplary configuration for cross-connection and resource allocation using HFA.

Connectivity group supports both HFA and non-HFA mode connections. HFA cross-connects between return link beam(s), channel(s), and time slot(s) and forward link beam(s), channel(s) and time slot(s) are setup on the satellite based on the desired connection. These circuit-like connections may be either pre-planned or dynamically setup according to the supported protocols on the terminals and at the hub/gateway.

FIG. 8 and Table 2 illustrate one example of time slot mapping performed for the connectivity group including five terminals. However, the subject technology is not limited thereto, and can apply to other multiples of terminals, as well as to groupings of different terminals.

As depicted in Table 2, column Tx is the transmitting terminal Column RL is the return link entry for the connectivity. Column Rx is the receiving terminal Column FL is the forward link entry for the connectivity.

TABLE 2

Exemplary Forwarding Table: Cross-Connect Map

| | Tx | RL | Rx | FL |
|---|---|---|---|---|
| 1 | T1 | T13 | T3 | R13 |
| 2 | T3 | T31 | T1 | R31 |
| 3 | T3 | T3S | T2 | R32 |
| 4 | | | T4 | R34 |
| 5 | | | T5 | R35 |
| 6 | T3 | T3H | Hub | Hub Link |

In some aspects, Terminal 1 and Terminal 3 have a bidirectional point-to-point full duplex connection (e.g., represented by entries in rows 1-2 of Table 2). This is an HFA mode entry. Terminal 3 is transmitting to terminals 2, 4, and 5 using a half-duplex time-shared connection (e.g., represented by entries in rows 3-5 of Table 2). This is an HFA mode entry. Terminal 3 is also connected to a hub in a half-duplex manner (e.g., represented by entries in row 6 of Table 2). This is a non-HFA mode entry.

FIG. 8 and Table 3 illustrate another example of time slot mapping performed for the connectivity group including five terminals. However, the subject technology is not limited thereto, and can apply to other multiples of terminals, as well as to groupings of different terminals.

TABLE 3

Exemplary Forwarding Table: Cross-Connect Map

| | Tx | RL | Rx | FL |
|---|---|---|---|---|
| 1 | T2 | T23 | T3 | R23 |
| 2 | T3 | T32 | T2 | R32 |
| 3 | T3 | T31 | T1 | R1S |
| 4 | T4 | T41 | | |
| 5 | T4 | T4N | T2 | R42 |
| 6 | | | T5 | R45 |
| 7 | T5 | T51 | T1 | R51 |

In some aspects, Terminal 2 and Terminal 3 have a bidirectional point-to-point full duplex connection (e.g., represented by entries in rows 1-2 of Table 3). This is an HFA mode entry. Terminal 3 and Terminal 4 are transmitting terminal(s) connected to receiving Terminal 1 using a point-to-point half duplex time-shared connection (e.g., represented by entries in rows 3-4 of Table 3). This is an HFA mode entry. Terminal 4 has a multicast connection to Terminal 2 and 5 (e.g., represented by entries in rows 5-6 of Table 3). Terminal 5 is connected to Terminal 1 over a half-duplex connection (e.g., represented by entries in row 7 of Table 3).

Figure 9:
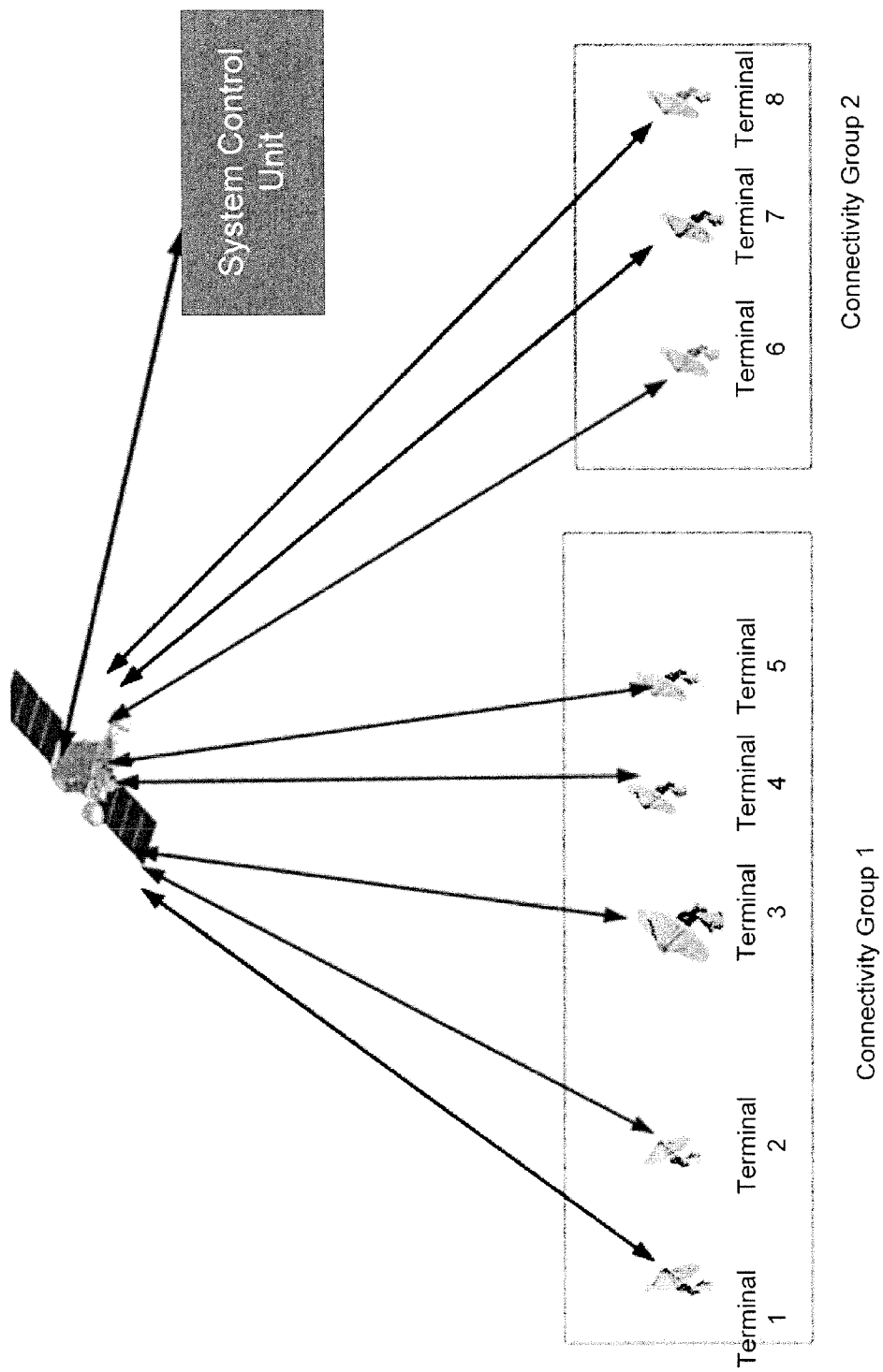
FIG. 9 illustrates an example of connectivity group(s) and resource allocation.

FIG. 9 illustrates an example of connectivity group(s) and resource allocation. In one or more implementations, a satellite system controller allocates resources by apportioning satellite resources for multiple connectivity groups. Adjustment to HFA connectivity between different terminals and cross-connects on the satellite are made by the resource allocation software hosted on the satellite system controller.

In one or more implementations, optional resource allocation within a connectivity group can be hosted on one of the terminals in the connectivity group. Resource allocation within a connectivity group is performed by the designated terminal hosting resource allocation in coordination with the satellite system controller resource allocation master.

Uplink Transmitting Terminal Operation

When a user packet arrives at the uplink terminal with a destination address identifier (protocol dependent, e.g., SIP) associated with a particular Connectivity Group, the terminal forwards that packet if it has an HFA path (beam(s), channel(s), time slot(s)) already setup for that Connectivity Group. Otherwise, the terminal forwards the packet to a satellite system controller as a default-forwarding path using non-HFA mode.

In one or more implementations, a satellite system controller decides if the packet should be forwarded to a known destination terminal. It may forward the packet to the intended known destination, or may decide to drop the packet silently (e.g., assuming connectivity is not permitted). The satellite system controller may proceed to set up an HFA cross-connect on the space vehicle. In one or more implementations, all subsequent packets from the source terminal will be directly forwarded to the destination terminal using HFA mode.

Satellite Operation

The satellite forwards, using a Waveform Store and Forward module, HFA uplink time slots (in the associated uplink beam and channel) to the appropriate downlink beam(s), channels(s) and time slot(s) based on the HFA forwarding tables.

Downlink Receiving Terminal Operation

Each receiving terminal demodulates and decodes the signal in each HFA time slot associated with its Connectivity Groups and forwards the decoded bits to the intended destination Connectivity Group.

Example of Functions and Components

In one or more implementations, an HFA-enabled satellite does not perform demodulation on waveforms before forwarding them to an appropriate downlink(s). Examples of demodulation not performed at the satellite may include digital demodulation such as some or all of the following: (i) bandpass demodulation based on, for example, phase shift keying, frequency shift keying, or amplitude shift keying (e.g., various types of PSK (e.g., QPSK, BPSK), FSK, ASK, QAM), and/or (ii) baseband demodulation for reducing intersymbol interference or for providing equalization. In one aspect, an HFA-enabled satellite does not perform any of the demodulation listed above.

In one or more implementations, an HFA-enabled satellite does not perform decoding on waveforms before forwarding them to an appropriate downlink(s). Examples of decoding not carried out at the satellite may include digital decoding such as some or all of the following: channel decoding (e.g., Forward Error Correction (FEC) decoding), decrypting, and/or source decoding. In one aspect, an HFA-enabled satellite does not perform any of the decoding listed above.

In one or more implementations, an HFA-enabled satellite does not transform waveforms into bits or streams of bits. Referring to FIG. 3A, after analog waveforms are converted into digital waveforms (e.g., by ADCs 304), the digital waveforms (e.g., waveforms of data and waveforms of control information) are not transformed into bits or streams of bits while being processed on the satellite. The digital waveforms may be, for example, digital bandpass waveforms or digital baseband waveforms. In FIG. 3A, data and control waveforms are not transformed into bits or streams of bits along the path between down converters 302 and HPAs 312. Waveforms may be transformed into bits or streams of bits at the destination terminal(s) or a system control unit(s), but not at the satellite.

Descriptions related to demodulation, decoding and waveforms are also provided in a book by Bernard Sklar, entitled, "Digital Communications—Fundamentals and Applications," Second Edition, Prentice Hall PTR, 2001, which is hereby incorporated by reference in its entirety for all purposes.

In one or more implementations, control information that may be provided from a satellite to a system control unit and vice versa may include one or more of the following: mapping between the uplink beams, channels, and time slots and the downlink beams, channels, and time slots (e.g., switching look-up tables) and uplink and/or downlink channel conditions (e.g., weather, jamming, antenna blockage, noise and/or terminal size).

Example of Computer System

Figure 10:
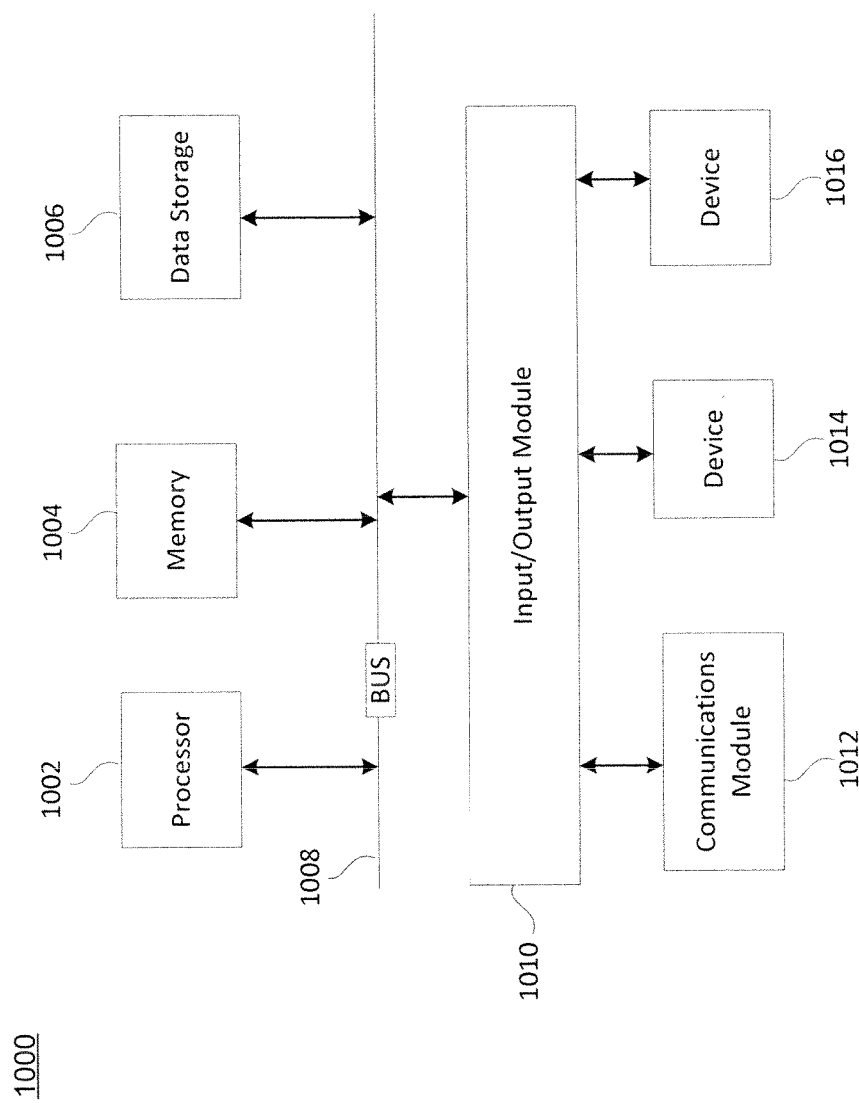
FIG. 10 is a block diagram illustrating an example of a computer system with which some implementations of the subject technology can be implemented.

FIG. 10 is a block diagram illustrating an example of computer system 1000 with which some configuration of the subject technology can be implemented. In certain aspects, computer system 1000 may be implemented using hardware or a combination of software and hardware, either in a dedicated computer or server, or integrated into another entity, or distributed across multiple entities. Each of a satellite, terminal, system control unit, satellite system controller, hub, and gateway may comprise a computer system 1000 to perform various operations described herein.

Computer system 1000 includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. For example, the memory 1004 includes instructions for implementing hub enabled signal hop transport forward access (HFA) mode. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer readable medium for execution by, or to control the operation of, the computer system 1000. Instructions may be implemented in various computer languages. Memory 1004 may be used for storing temporary variable or other intermediate information during execution of instructions to be executed by processor 1002.

A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk, optical disk or solid-state disk, Static Random Access Memory (SRAM) and Dynamic Random Access Memory (DRAM), coupled to bus 1008 for storing information and instructions. Computer system 1000 may be coupled via input/output module 1010 to various devices. The input/output module 1010 can be any input/output module. The input/output module 1010 is configured to connect to a communications module 1012. Example communications modules 1012 include networking interface cards. In certain aspects, the input/output module 1010 is configured to connect to a plurality of devices, such as an input device 1014 and/or an output device 1016. Example input devices 1014 include one or more ADCs. Example output devices 1016 include one or more DACs.

The term "machine-readable storage medium" or "computer readable medium" as used herein refers to any medium or media that participates in providing instructions or data to processor 1002 for execution. Such a medium may take many forms, including, but not limited to, non-volatile media, and volatile media.

Illustration of Subject Technology as Clauses

Various examples of aspects of the disclosure are described as numbered clauses below (e.g., 1, 2, 3, etc.) for convenience. These are provided as examples, and do not limit the subject technology.

1. A satellite system that allows direct forwarding of in-theater traffic on a time-slot by time slot basis, without the need for demodulation or decoding.
2. A satellite system that allows per channel, per beam, per time slot, waveform sample forwarding between uplink and appropriate downlink beams, channels and time slots.
3. A satellite system that allows modulation independent signal transponding between uplink beams, channels and time slots onto appropriate downlink beams, channels and time slots.
4. A satellite system that allows independent bandwidth rate adjustments between uplink and downlink transponded signal via Waveform Store and Forward (WSAF) to accommodate independent channel conditions between the downlink and uplink (e.g. noise, jamming, antenna blockage, terminal size).
5. A satellite system that Waveform Stores and Forward (WSAF) uplink time slots for each channel and beam onto appropriate downlink channels, beams and time slots.
6. A satellite system that allows fast unicast switching between uplink beams, channels and time slots and downlink beams, channels, and time slots.
7. A satellite system that allows fast multicast switching between uplink beams, channels and time slots and downlink beams, channels, and time slots.
8. A satellite system that allows fast broadcast switching between uplink beams, channels and time slots and downlink beams, channels, and time slots.
9. A satellite system that allows separation of control and data between uplink beams, channels and time slots.
10. A satellite system that allows forwarding of uplink beam, channel, and time slot to downlink beam, channel, and time slot based on look-up tables assigned dynamically by a satellite system controller.
11. A satellite system method of dynamically altering downlink and uplink signal robustness and data rate based on uplink and downlink measurements, varying downlink modulation and coding and varying WSAF playback rate on the downlink.
12. A satellite system that allows satellite operator to centrally control connectivity among a group of user terminals allowing a group of terminals to implement a virtual private network over an HFA enabled satellite.
13. A satellite system method of setting up a point-to-point half-duplex (or simplex) one-way connection from a transmitting terminal to a receiving terminal using WSAF over an HFA enabled satellite.
14. A satellite system method of setting up a point-to-point full duplex two-way connection between two terminals where 1) Terminal 1 transmits data to Terminal 2, and receives data from Terminal 2, and 2) Terminal 2 transmits data to Terminal 1, and receives data from Terminal 1 using WSAF over an HFA enabled satellite.
15. A satellite system method of setting up a point-to-point full duplex two-way asymmetric connection between two terminals where rates are different in each direction using WSAF over an HFA enabled satellite.
16. A satellite system method of setting up a point-to-point full duplex two-way symmetric connection between two terminals where rates are identical in either direction using WSAF over an HFA enabled satellite.
17. A satellite system method of setting up a half-duplex time shared connection consisting of many receiving terminals and one transmitting terminal using WSAF over an HFA enabled satellite.
18. A satellite system method of setting up a half-duplex time shared connection consisting of many transmitting terminals and one receiving terminal using WSAF over an HFA enabled satellite.
19. A satellite system method of setting up broadcast connection consisting of many receiving terminals and one transmitting terminal using WSAF over an HFA enabled satellite.
20. A satellite system method of setting up connections using a combination of techniques listed in clauses 15 through 19 but not limited to techniques listed in clauses 15 through 19 using WSAF over an HFA enabled satellite.

Other Descriptions

In one aspect, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., Waveform Store and Forward (WSAF) module therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, means, a block, a module, an element, a component or a processor may be an item (e.g., one or more of blocks, modules, elements, components or processors) for performing one or more functions or operations. In one aspect, such an item may be an apparatus, hardware, or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), a portion(s) or a combination(s) of any of the foregoing. In one example, an item may have a structure in the form of, for example, an instruction(s) encoded or stored on a machine-readable medium, on another device, or on a portion thereof. An instruction(s) may be software, an application(s), a subroutine(s), or a portion thereof for performing the function(s) or operation(s). The instruction(s) may be executable by one or more processors. Those skilled in the art will recognize how to implement the circuits, processing systems, instructions and a combination thereof.

In one aspect of the disclosure, when actions or functions (e.g., receiving, converting, transmitting, or any other action or function) are described as being performed by an item (e.g., one or more of blocks, modules, elements, components or processors), it is understood that such actions or functions may be performed, for example, by the item directly. In another example, when an item is described as performing an action, the item may be understood to perform the action indirectly, for example, by facilitating such an action (e.g., assisting, allowing, enabling, causing, or providing for, such action to occur; or performing a portion of such an action). For example, receiving can refer to facilitating receiving, and transmitting can refer to facilitating transmitting. In one aspect, performing an action may refer to performing a portion of the action (e.g., performing a beginning part of the action, performing an end part of the action, or performing a middle portion of the action).

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for satellite communication, comprising:
    receiving, at a satellite, waveforms associated with one or more uplinks between the satellite and at least one terminal;
    storing, temporarily in one or more uplink memories of a waveform store and forward (WSAF) module of the satellite, the received waveforms;
    separating, with the WSAF module of the satellite, waveforms of data and waveforms of control information from within the stored waveforms based on uplink channel time slots;
    forwarding, to one or more downlink memories within the WSAF module of the satellite, the waveforms of data on a time slot by time slot basis for one or more downlinks between the satellite and one or more terminals;
    forwarding the waveforms of control information on a time slot by time slot basis to a satellite control unit;
    dynamically altering uplink signal robustness and rate based on uplink measurements provided by the satellite control unit;
    dynamically altering downlink signal robustness and rate based on downlink measurements provided by the satellite control unit; and
    dynamically varying a playback rate of the waveforms of data for downlink based on the downlink measurements.

2. The method of claim 1, wherein a group of user terminals comprises the at least one terminal and the one or more terminals, and the method allows centrally controlling connectivity among the group of user terminals allowing a group of terminals to implement a virtual private network.

3. The method of claim 1, comprising one or more of the following operations performed utilizing the waveform store and forward (WSAF) module of the satellite:
    setting up a point-to-point half-duplex or simplex one-way communication connection from a transmitting terminal to a receiving terminal;
    setting up a point-to-point full duplex two-way communication connection between two terminals to allow (i) a first one of the two terminals to transmit data to the second one of the two terminals, (ii) the first one of the two terminals to receive data from the second one of the two terminals, (iii) the second one of the two terminals to transmit data to the first one of the two terminals, and (iv) the second one of the two terminals to receive data from the first one of the two terminals;
    setting up a point-to-point full duplex two-way asymmetric communication connection between at least two terminals, wherein communication rates are different in each direction of the point-to-point full duplex two-way asymmetric communication connection,
    wherein the at least one terminal comprises the transmitting terminal, wherein the one or more terminals comprise the receiving terminal, wherein the at least one terminal and the one or more terminals comprise the two terminals, and wherein the at least one terminal and the one or more terminals comprise the at least two terminals.

4. The method of claim 1, comprising: setting up a point-to-point full duplex two-way symmetric communication connection between two terminals, utilizing the waveform store and forward (WSAF) module of the satellite, wherein communication rates are identical in either direction of the point-to-point full duplex two-way symmetric communication connection, wherein the at least one terminal and the one or more terminals comprise the two terminals.

5. The method of claim 1, comprising: setting up a half-duplex time shared communication connection for a group of terminals consisting of a plurality of receiving terminals and one transmitting terminal, utilizing the waveform store and forward (WSAF) module of the satellite, wherein the at least one terminal comprises the one transmitting terminal, and wherein the one or more terminals comprise the plurality of receiving terminals.

6. The method of claim 1, comprising: setting up a half-duplex time shared communication connection for a group of terminals consisting of a plurality of transmitting terminals and one receiving terminal, utilizing the waveform store and forward (WSAF) module of the satellite, wherein the at least one terminal comprises the plurality of transmitting terminals, and wherein the one or more terminals comprise the one receiving terminal.

7. The method of claim 1, comprising: setting up a broadcast connection for a group of terminals consisting of a plurality of receiving terminals and one transmitting terminal, utilizing the waveform store and forward (WSAF) module of the satellite.

* * * * *